United States Patent Office 3,019,213
Patented Jan. 30, 1962

3,019,213
POLYMERIZATION OF 2,5-DIMETHYL-2,4-HEXADIENE
Frank Baldwin Moody, West Chester, Pa., assignor to E. I. du Pont de Nemours and Company, Wilmington, Del., a corporation of Delaware
No Drawing. Filed Sept. 18, 1958, Ser. No. 761,683
7 Claims. (Cl. 260—94.2)

The present invention relates to new synthetic, fiber-forming polymers and to the production of films and fibers therefrom.

The polymerization of dienes has been investigated for more than 50 years. Diene polymers are generally low melting and rubbery in nature and are thus unsuited for the formation of fibers and films. Natural rubber is cis-1,4-polyisoprene while other commercially useful rubbers are based upon butadiene and 2-chlorobutadiene. Some methylated butadienes such as poly(2,3-dimethyl-butadiene), the so-called "methyl rubber" have been used in the past as synthetic rubber.

Polyhydrocarbons, as a class, have a high resistance to degradation by water and a high degree of chemical inertness. However, in general, they are far too low melting or insufficiently crystalline to possess utility in textile applications such as in fibers and films. Polydienes in particular are deficient in these respects.

It is an object of the present invention to provide a new hydrocarbon polymer of high molecular weight and high melting point. It is another object to provide a highly crystalline polymeric hydrocarbon material. A further object is the provision of fibers, films, and coatings of such high melting hydrocarbon polymers.

These and other objects are accomplished by the preparation of high molecular weight polymers from monomers of the formula

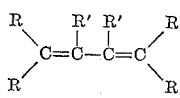

in which R is lower alkyl of from 1–6 carbon atoms such as methyl, ethyl, propyl, etc. and R' is lower alkyl of 1–6 carbon atoms or hydrogen. These polymers melt at temperatures unusually high for polyhydrocarbons, i.e., above 200° C. They are resistant to practically all solvents at ordinary temperatures but have excellent solubility in nonpolar solvents at elevated temperatures. Furthermore, they are highly crystalline and tough.

At the present time, there is extensive commercial development of fibers made from crystalline, isotactic polypropylene and from high density polyethylene. However, these polymers melt between 120–165° C. and therefore are very limited in their industrial applications. Other polymers from olefinic hydrocarbons are objectionable for the same reason. The prior art polymers from hydrocarbons possessing two conjugated double bonds are even lower melting, and generally amorphous and rubbery.

The polymers of the present invention are made by contacting selected monomeric dienes of the class described above with an acidic catalyst at temperatures between about −100° C. to 0° C. The polymerization is extremely rapid and high yields of high molecular weight polymer are obtained in a matter of a few seconds.

The present invention is better demonstrated by reference to the following examples which are illustrative only and not intended to be limiting the invention. All parts are by weight and the inherent viscosities were measured at 130° C. in decahydronaphthalene containing 0.5% polymer.

Example I

A round-bottomed, four-necked, creased flask was fitted with a thermometer, a stirrer, a gas inlet tube, a drying tube, and a dropping funnel. The flask containing 500 parts of petroleum ether was immersed into a cooling bath consisting of solid carbon dioxide and ethylene glycol monomethyl ether at −72° C. A gentle stream of boron trifluoride was bubbled into the stirred solvent for a few minutes until white vapors came out of the drying tube. A solution of 75 parts of 2,5-dimethyl-2,4-hexadiene in 50 parts of petroleum ether was added with rapid stirring while the flask was still immersed in the cooling bath. About 1/10 of the diene solution was added in the first 30 seconds, the rest within the next approximately 200 seconds. The exothermic reaction raised the temperature spontaneously to −50° and the reaction mixture became a yellow slush. After stirring it for another minute, the cooling bath was removed and 80 parts of alcohol was added followed by the addition of about 400 parts of acetone. This addition resulted in the complete disappearance of the yellow color and the poly(2,5-dimethyl-2,4-hexadiene) was obtained as a finely divided white suspension in the mixture of solvents. The polymer was filtered off, washed with acetone on the filter, and dried. Fifty-four parts of the high molecular weight polymer was obtained in this manner. It was soluble in hot decahydronaphthalene, yielding a viscous solution from which it precipitated on cooling. The inherent viscosity was 1.44.

The polymer had a melting point of 264–5° C. and was soluble in other non-polar solvents, e.g., benzene, toluene, methylene chloride, naphthalene, chlorobenzene, o-dichlorobenzene, xylene, n-decane, n-decyl alcohol, diphenyl ether, diphenyl methane, etc. at temperatures above about 120° C.

The above reaction gave similar results when petroleum ether was replaced by carbon disulfide, toluene, carbon tetrachloride, chloroform, or hexane. The yields varied between 60 and about 80% of the theoretical amount.

Example II

Eighty parts of the polymer described in Example I was mixed with 80 parts of redistilled decahydronaphthalene. A portion of this mixture was molded at 160° C. under pressure into a rod 0.5" in diameter and about 3.25" long. The rod was charged into a press spinning apparatus from which it was extruded at 220° C. A pressing cylinder forced the rod through a spinneret with a single hole of 30 mils diameter. A white somewhat brittle monofilament was obtained.

Example III

A polymer made according to Example I with an inherent viscosity of 0.56 was pressed at about 2,000 p.s.i. into a film in a laboratory press at plate temperatures of 240–245° C. A transparent somewhat brittle film was obtained. This film had unusually high crystallinity as revealed by X-ray diffraction. Approximately 10% of the material present was amorphous which is exceptionally low for a high molecular weight polymer.

The crystalline melting point of the polymeric film was determined on the microscope hot stage by the method of Evans et al. [J. Am. Chem. Soc., 72, 2018 (1950)]. The crystalline melting point is the temperature at which the brightness disappears when the film is observed between crossed Nicol prisms. The crystalline melting point was 262–3° C.

Example IV

In a modification of Example I, all of the 2,5-dimethyl-2,4-hexadiene was added within a period of 10–15 seconds. The mixture was stirred for 30–40 seconds, and became a thick yellow slush. After stirring for an additional 2½ minutes, the product was worked up as described in Example I. The dried product comprised 34 parts of white powdered poly(2,5-dimethyl-2,4-hexadiene) with an inherent viscosity of 1.28. A melt-pressed film from this polymer was transparent and showed extremely high X-ray crystallinity.

*Example V*

Ten parts of the polymer described in Example III was charged into a stainless steel bomb together with 67 parts of methylene chloride. The bomb was equipped with a single hole 50 mil diameter spinneret. The sealed bomb was heated to 200° while rotating to dissolve the polymer. When reaching this temperature, the rotation was stopped and the valve between the bomb and the spinneret opened, upon which the polymer flashed out into room temperature and atmospheric pressure in the form of very fine short fibers. The X-ray diffraction patterns of this flash-spun fiber showed that the crystallinity was again very high but the crystal perfection only moderate. Thus, this very rapid spinning technique was useful in getting fibers amenable to further processing since their crystallinity was much lower than obtained by melt pressing or melt extruding.

*Example VI*

Approximately one ml. of 2,5-dimethyl-2,4-hexadiene was placed in a 5″ test tube and the test tube rotated so that the diene wetted the walls. A glass tube connected to a boron trifluoride cylinder was inserted almost to the bottom of the test tube and a gentle stream of gaseous boron trifluoride introduced for a brief moment. Immediately after the introduction of the boron trifluoride, the test tube was plunged into a cooling bath at about −70° C. in such a way that the outside of the entire wetted test tube surface contacted the cooling mixture without permitting the cooling mixture to enter the test tube. A film of tough transparent polymer was formed on the interior walls of the test tube. The tough translucent film which showed inherent viscosities as high as 1.2 could be cold or hot drawn. The undrawn film showed a lower degree of crystallite perfection in the X-ray diffraction pattern when compared to the somewhat brittle melt-pressed films.

The above film drawn 5× at 120° C. also showed high orientation, high X-ray crystallinity with very high crystallite perfection.

Flms made in this manner are much tougher than the melt-pressed films described in Examples III and IV even though the inherent viscosity of the films was not necessarily higher than that of the brittle films.

This example also demonstrates a new technique of "chemical film casting" to produce tough, drawable, orientable films with greatly improved properties compared to the conventional melt-pressed films. This process can readily be adapted to a continuous process due to the extremely high speed of polymerization at low temperatures. Thus, by extruding the monomer with or without a suitable diluent onto a belt or roll, contacting it with an acidic catalyst and cooling it to a temperature of rapid polymerization, a polymerized, extruded, tough, self-supporting, drawable product is obtained. Alternatively, the monomer and catalyst may be mixed at a temperature above the temperature of rapid polymerization and then extruded and cooled to effect polymerization. Fibers can be produced by a similar method on a continuous basis.

It can be seen from these examples that the polymers of the present invention offer a unique combination of properties for many uses. These examples, for practical purpose, refer to the preferred 2,5-dimethyl-2,4-hexadiene homopolymers. Similar homopolymers are produced from such monomers as 3,6-diethyl-3,5-octadiene, 4,7-dipropyl-4,6-decadiene, 2,3,4,5-tetramethyl-2,4-hexadiene and similar lower-alkyl-substituted conjugated dienes. It is of particular interest that the polymerization can be carried out in the same solvent which can be used as a flash spinning solvent.

In the above examples, boron trifluoride has been used as a catalyst. Although this is the preferred catalyst, other acid catalysts of the type decribed by G. N. Lewis, Journal of the Franklin Institute, 226, 293 (1938), such as aluminum chloride and sulfuric acid are similarly useful.

The polymers of the present invention are particularly useful for the preparation of fibers, films and coatings, due to their good solubility in hot nonpolar solvents, their high melting point, and high molecular weight, their excellent resistance to corrosive chemicals and micro-organisms. They also adapt very well to the formation of fibrils useful in the paper art.

I claim:
1. A method for preparing polymers of high melting point and high molecular weight which comprises contacting 2,5-dimethyl-2,4-hexadiene with a Lewis acid catalyst at a temperature of about −100° C.–0° C.
2. A chemical film casting process comprising contacting a diene of the formula

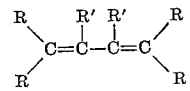

wherein R is lower alkyl and R′ is selected from the group consisting of hydrogen and lower alkyl in the form of a film with a Lewis acid catalyst and cooling it to a temperature of from about −100° C. to 0° C.
3. The process of claim 2 wherein the acid catalyst is boron trifluoride.
4. A method for preparing polymers of high melting point and high molecular weight which comprises contacting 2,5-dimethyl-2,4-hexadiene with boron trifluoride at a temperature of from about −100° C. to 0° C.
5. A high molecular weight, crystalline, homopolymeric 2,5-dimethyl-2,4-hexadiene having a melting point of at least 200° C.
6. A fiber produced from the polymer of claim 5.
7. A film produced from the polymer of claim 5.

References Cited in the file of this patent
UNITED STATES PATENTS

| | | |
|---|---|---|
| 2,431,315 | Drummond | Nov. 25, 1947 |
| 2,457,306 | Drefus | Dec. 28, 1948 |
| 2,612,493 | Sparks et al. | Sept. 30, 1952 |
| 2,671,079 | McCormack | Mar. 2, 1954 |